Nov. 12, 1940. J. D. BATES 2,221,128
BATHING BRUSH
Filed March 4, 1938
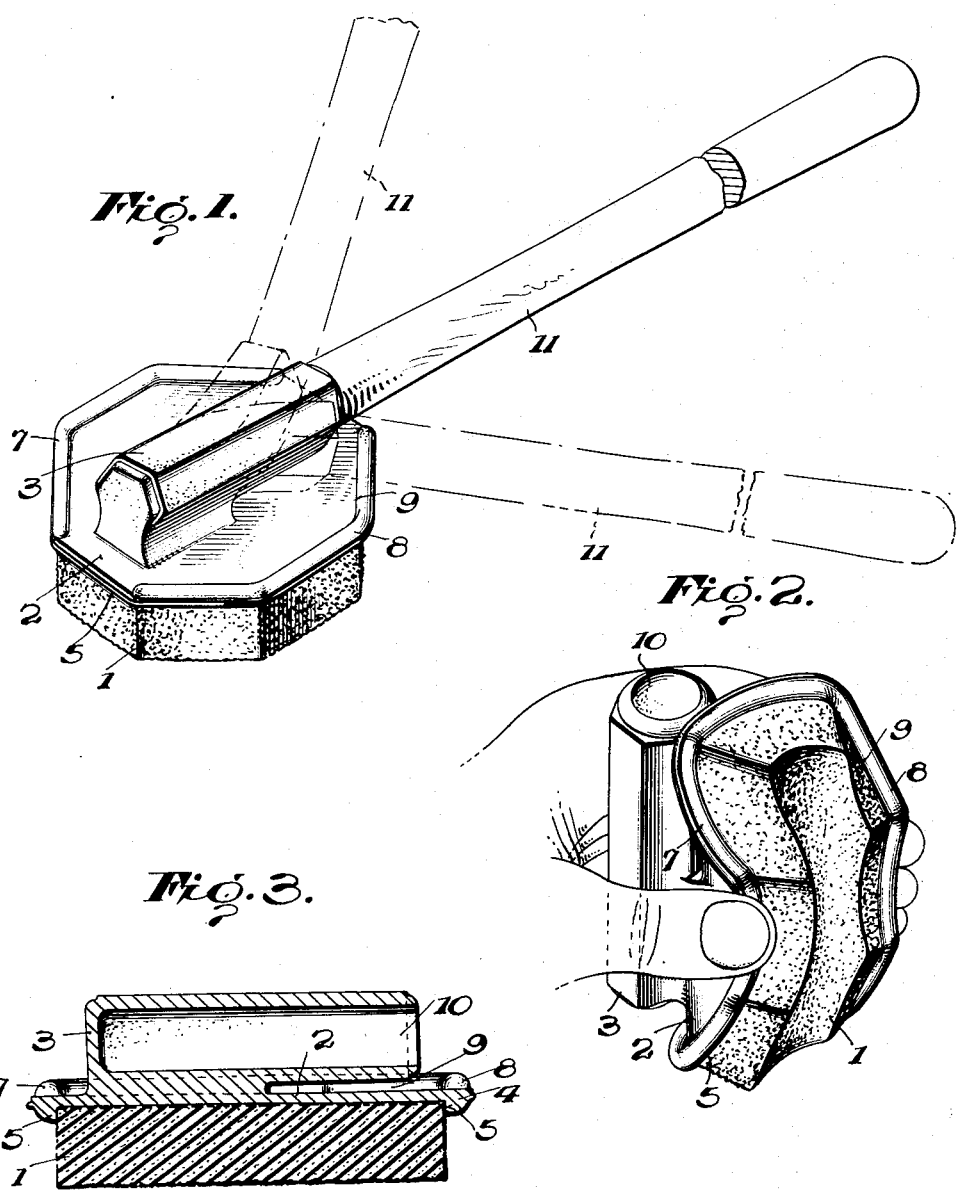
Inventor
Joseph D. Bates.
By Samuel Scrivener Jr.
Attorney Patented Nov. 12, 1940

2,221,128

UNITED STATES PATENT OFFICE 2,221,128

BATHING BRUSH

Joseph D. Bates, West Springfield, Mass.

Application March 4, 1938, Serial No. 193,995

1 Claim. (Cl. 15—244)

This invention relates generally to cleaning devices and, more particularly, is intended to provide a new and improved brush which is particularly adapted for personal cleaning purposes.

It is a primary object of the invention to provide a bath brush which will be formed entirely of flexible material, such as rubber or sponge rubber, whereby the device may be bent or deformed to any shape to more efficiently perform any desired cleaning operation. In carrying out this aspect of my invention I also propose to provide my improved cleaning device with ribs or other means which are so disposed with reference to the main body of the cleaning device that they will not only provide additional rigidity to the entire device but will also provide finger grip portions whereby the device may be more easily grasped and manipulated by the hand.

I also propose to provide, at a suitable location on the cleaning device, a handle means which is so formed and constructed that it may be easily and comfortably grasped by the hand, and is also so constructed that it provides a ferrule which is preferably flexible and which is adapted to receive a handle, should it be desired to mount the cleaning device on the end of a handle.

Another object of my invention is the provision of a flexible cleaning device which is provided with a flexible backing member which may be bent in such a way as to enclose and squeeze the cleaning portion of the device between opposed portions thereof, to thereby remove any fluid from the cleaning portion.

Other objects and features of novelty of my invention will be apparent from the following description and the appended drawing, it being clearly understood, however, that such description and drawing are not in any sense to be considered as limiting the scope of the invention but are to be considered only as illustrating one practical embodiment of the invention.

Referring to the drawing, wherein similar reference numerals refer to like parts, Fig. 1 is a perspective view of a cleaning device formed according to my invention and having a handle attached thereto;

Fig. 2 is a view showing the manipulation of cleaning device of Fig. 1, and

Fig. 3 is a sectional view of the cleaning device shown in Fig. 1, through the cleaning portion and handle portion thereof.

By the present invention I have provided a cleaning implement which is particularly intended for use in personal bathing, this implement being preferably formed of some light, flexible material such as rubber or sponge rubber and being of such size and configuration and being so formed that it may be used and manipulated either by grasping it in the hand or by attaching it to the end of a handle.

One form which may be taken by my invention is illustrated in the drawing forming part of this application and, referring thereto, it will be seen that the disclosed embodiment comprises a cleaning portion 1, a backing portion 2, and a handle or handle-receiving ferrule 3. The cleaning portion 1 is preferably formed as a generally flat, slab-like member of polygonal or other desired shape and is preferably of such size that it may be easily and comfortably grasped in the hand. This member is formed of some light, preferably porous material such as sponge or sponge rubber which is suitable for cleaning purposes.

A backing for the cleaning element 1 is provided by the invention and comprises a generally flat, thin member 2 which is attached to and covers one of the faces of the cleaning element 1 and is preferably formed of some solid but light and flexible material such as rubber. This backing portion is preferably formed of the same shape as the cleaning element and is preferably made somewhat larger than the cleaning element, providing an edge flange 4 as clearly illustrated in Fig. 3 of the drawing. In order to provide a recess on the lower face of the backing within which one face of the cleaning element 1 may be received, a bead 5 is formed on the lower face of the backing and adjacent the periphery thereof, the outer face of this bead being preferably arcuate, while the inner face thereof is preferably formed at a right angle to the plane of the backing in order to provide a suitable recess for the reception of the cleaning element. It will be apparent that the cleaning element may be attached to the backing member in any suitable manner, as by gluing or vulcanization.

Means are provided by the invention for giving added rigidity to the backing member and for providing a finger grip whereby the device may be more easily manipulated by the hand. Such means, as illustrated in the drawing, preferably take the form of one or more ridges which are disposed on and extend above the upper surface of the backing member and which are arranged adjacent the edge or edges thereof. In the embodiment disclosed, two ridges 7 and 8 are provided, these being arranged on opposite sides of the backing member and each conforming to the configuration of the side with which it is associated. While the invention contemplates other arrangements as well, it is preferred to provide the two ridges, as illustrated, in order to facilitate the bending of the cleaning implement along a medial line extending between the ridges, as illustrated in Fig. 2.

It will be seen that the ridges 7, 8 will provide convenient means against which the finger-tips may be rested when it is desired to bend or otherwise manipulate the cleaning implement. It will also be apparent that these ridges, and the bead 5 will provide added rigidity to the implement and will improve the appearance thereof.

The invention also includes the provision of handle means for the cleaning implement described, by which handle means the device may be manipulated, either by directly grasping the handle with the hand or by attaching it to a separate handle. In the preferred embodiment of my invention, as illustrated in the drawing, such means comprise an elongated handle or handle-receiving member 3, the axis of which is arranged in parallelism to the plane of the backing member 2 and which is formed with an elongated opening 10 therein, within which the end of a handle member 11 may be inserted. It will be seen that when the handle member is inserted in the socket 10 it will extend in parallelism to the plane of the backing member 2, as illustrated in Fig. 1.

The handle or handle-receiving member 3 is preferably formed of some flexible, resilient material, such as rubber, and is attached to the backing portion 2 throughout only a portion of its length, thereby leaving an elongated cut or aperture 9 below a major portion of the handle member. The attachment between the handle member and the backing member is preferably made by the integral formation of these members, although they may be united by other means, such as gluing, if desired. It is important, however, that the handle 3 be united to the backing 2 by some flexible means in order that the use of the cleaning device in all positions will be unrestricted.

If desired, the handle or handle-receiving portion 3 may be formed in any desired shape or as a representation of any desired figure, such as an animal or boat figure, in order to make the implement more attractive and pleasing, particularly to children. Further, the handle 3 may be ornamented in any desired manner.

In the use of the cleaning implement, the handle member 3 may be grasped by the hand, or a separate handle may be inserted in the opening 10 and the device manipulated by means of the separate handle. In either case the cleaning portion of the device may be freed of any water or cleaning fluid therein by bending or folding the entire device about a medial line thereof, as clearly illustrated in Fig. 2, whereby the cleaning portion 1 of the device is squeezed between the two halves of the backing portion 2, these halves forming, in effect, wings which may be pressed together to squeeze the cleaning portion therebetween. Due to the resilient nature of all parts of the implement, the normal shape thereof will be restored immediately upon the release of squeezing pressure on the device.

It is believed that the many and various uses and modes of operation of devices formed according to my invention will be apparent and obvious from the foregoing description and the annexed drawing and that no detailed discussion or explanation thereof is required.

It will be understood that the use of the word "handle" in the specification or claim of this application is not to be considered as imposing any limitation on this feature of the invention, and it will be understood that this word refers to handle-receiving ferrules as well as to handles per se.

It will be recognized by those skilled in the art that the invention, as described, may be susceptible of many modifications and improvements, all of which will be within the scope and spirit of this invention, for the limits of which reference must be had to the appended claim.

I claim:

A cleaning implement comprising a flat, solid backing member of such shape and size as to conveniently fit the hand and which is formed of flexible material, a continuous bead formed on the inner face of said backing member and extending about the periphery thereof and forming with the inner face of said backing member a recess within which is received a substantially flat cleaning element formed of sponge material, spaced ridges formed on the outer face of said backing member and each extending about approximately one-half of the periphery thereof, an elongated handle member formed of flexible material and being disposed adjacent the outer face of the backing member and normally extending in parallelism thereto, and a connecting member which is integral with said handle member and the outer face of said backing member and which extends throughout only a portion of the length of the handle member, whereby the handle member may be freely manipulated with respect to the backing member and the attached cleaning element.

JOSEPH D. BATES.